United States Patent [19]

Marsala et al.

[11] Patent Number: 5,691,475

[45] Date of Patent: Nov. 25, 1997

[54] METHOD FOR MEASURING THE PROPAGATION VELOCITY OF ULTRASONIC ACOUSTIC WAVES THROUGH ROCK FRAGMENTS

[75] Inventors: Alberto Marsala, Bergamo; Fabrizio Zausa, Calvignasco; Santarelli Frederic, S. Donato Mil.se, all of Italy

[73] Assignee: Agip S.p.A., Milan, Italy

[21] Appl. No.: 565,823

[22] Filed: Dec. 1, 1995

[30] Foreign Application Priority Data

Dec. 15, 1994 [IT] Italy .................. MI94A2526

[51] Int. Cl.$^6$ .................................................. G01N 29/18
[52] U.S. Cl. .................. 73/597; 73/152.43; 73/152.03; 367/27; 181/102
[58] Field of Search .................. 73/597, 598, 644, 73/152.01–152.62; 367/25, 27, 35; 364/422; 181/102–105

[56] References Cited

U.S. PATENT DOCUMENTS

| | | | |
|---|---|---|---|
| 3,995,501 | 12/1976 | Wiley | 73/560 |
| 4,002,221 | 1/1977 | Buchalter | 181/0.5 |
| 4,365,516 | 12/1982 | Molina | 73/644 |
| 4,933,911 | 6/1990 | Sondergeld et al. | 73/597 |

*Primary Examiner*—Hezron E. Williams
*Assistant Examiner*—Rose M. Miller
*Attorney, Agent, or Firm*—George P. Hoare, Jr.; Rogers & Wells

[57] ABSTRACT

Method for measuring the propagation velocities of ultrasonic acoustic waves through rock fragments which includes the steps of (a) introducing the fragment in a coupling fluid between a pair of piezoelectric transducers capable of generating highly damped ultrasonic acoustic waves; (b) passing highly damped ultrasonic acoustic waves through the fragment, said waves being generated by a pulse generator with a pulse width varying from 0.1 μs to 20 μs; (c) visualizing the obtained electric signals by an oscilloscope with a resolution of at least $10^{-2}$ μs; and (d) measuring the transit time of the waves themselves. The ultrasonic acoustic waves may be compressional or shear waves. In one embodiment the coupling fluid has a viscosity varying be 200 and 800 poises.

7 Claims, 4 Drawing Sheets

FIG. I

METHOD FOR MEASURING THE PROPAGATION VELOCITY OF ULTRASONIC ACOUSTIC WAVES THROUGH ROCK FRAGMENTS

FIELD OF THE INVENTION

The present invention relates to a method for measuring the propagation velocity of compressional and shear ultrasonic acoustic waves through rock fragments, coming directly from the drilling of wells in the oil industry and having dimensions of even less than one centimeter in diameter, said method comprising passing the acoustic waves through the fragment of interest and measuring their transit time through the fragment itself, placed inside a system consisting of a pair of piezoelectric transducers.

This method extends the potentiality of the technique normally used in the laboratory for measurements of the propagation velocity of ultrasonic waves on a core, to measurements on rock fragments which reach the surface during drilling.

BACKGROUND OF THE INVENTION

In order to successfully deal with problems relating to the drilling of an oil well (wellbore stability, sand production or subsidence etc.), it is important to be able to mechanically characterize the rock formations while drilling.

Up until now this has been possible by carrying out geomechanical tests in the laboratory on core samples, taken from the well; unfortunately the results of these tests depend on the times and costs of the coring operations, as well as on only the intervals of rock from which the cores are removed.

Among the measurements which are carried out in the laboratory on rock samples taken from cores, there is the measurement of the velocity of compressional and shear ultrasonic acoustic waves, using the Pulse Velocity technique (according to the standard ASTM D2845-90) which enables the moduli of elasticity to be calculated, within the scope of the linear elasticity theory, directly corelating with the mechanical strength of the rock formations from which the cores are recovered.

Usually, in order to have these values for the whole length of the well, once the drilling has been completed, the sonic logs are recorded, this term relating to the determination of the transit times of the acoustic waves by means of a probe lowered inside the well itself; in this way however it is not possible to intervene in real time on the drilling strategies. FIG. 4 shows the comparison between the sonic log and the compressional wave velocity measurements on rock fragments, hereafter called "cuttings" (Vp-PUC: Pulsed Ultrasound on Cuttings). The data were recorded by the applicant on an oil well on July 1994.

SUMMARY OF THE INVENTION

To overcome the drawbacks described above, the Applicant has found that it is possible to achieve the above purposes by analysis of the cuttings produced while drilling and collected on the surface, subsequently inserting the results in a complete data collection program in the field, such as geological-petrographical analyses of the work-site and indentation measurements.

In particular the method of the present invention is determinant in that it provides information in real time on the nature of the rock layers which are being drilled, thus allowing incisive intervention during the drilling.

In addition a knowledge of the propagation velocity of the compressional and shear ultrasonic acoustic waves is of particular importance in the calibration and comparison with data from seismic profile and sonic log registrations mainly for explorative purposes.

The present invention therefore relates to a method for measuring the propagation velocity of compressional and shear ultrasonic acoustic waves through rock fragments, coming directly from the drilling of oil wells and with dimensions of even less than one centimeter in diameter, said method comprising passing the acoustic waves through the fragment of interest and measuring their transit time, after inserting the fragment itself into a particular system of piezoelectric transducers.

In particular the method uses a pulse generator necessary for producing an electric signal which permits the emitter transducer to generate a compressional or shear ultrasonic wave depending on the type of transducer used.

Particular care was taken in selecting the coupling fluids between the transducers and the cuttings; these fluids are characterized by viscosity values between 200 and 800 poises measured with a shear velocity gradient of $3.1\ s^{-1}$ (standard American Petroleum Institute 13 B-1).

The ultrasonic wave transmitted through the sample, is converted into an electric signal by the receiving transducer; the electric signal received is then visualized by means of a digital oscilloscope which, considering the delay of the transducers and circuit, enables the transit time of the ultrasonic perturbation through the cuttings to be determined.

As the thickness of the cuttings is measured, it is thus possible to determine the propagation velocity of the compressional or shear ultrasonic waves.

The advantage of the method of the present invention lies in extending the potentiality of the Pulse Velocity technique used in the laboratory for propagation measurements of ultrasonic waves on a core (for example cylindrical samples of 2.5 cm in diameter and double height), to measurements on rock fragments even with dimensions of less than one centimeter, which arrive on the surface while drilling.

This extension of the method is made possible owing to the use of particular piezoelectric transducers, the selection of the form of emission pulses to be determined in relation to the characteristics of the piezoelectric crystals themselves, the selection of propagation frequencies and identification of the fluids necessary for the mechanical coupling between cutting and transducers to optimize the transmission of the ultrasonic wave.

In conclusion the present method surprisingly integrates and improves the known applications and provides a means which can be used industrially for on rig-site measurements.

DETAILED DESCRIPTION OF THE INVENTION

Figure 1:
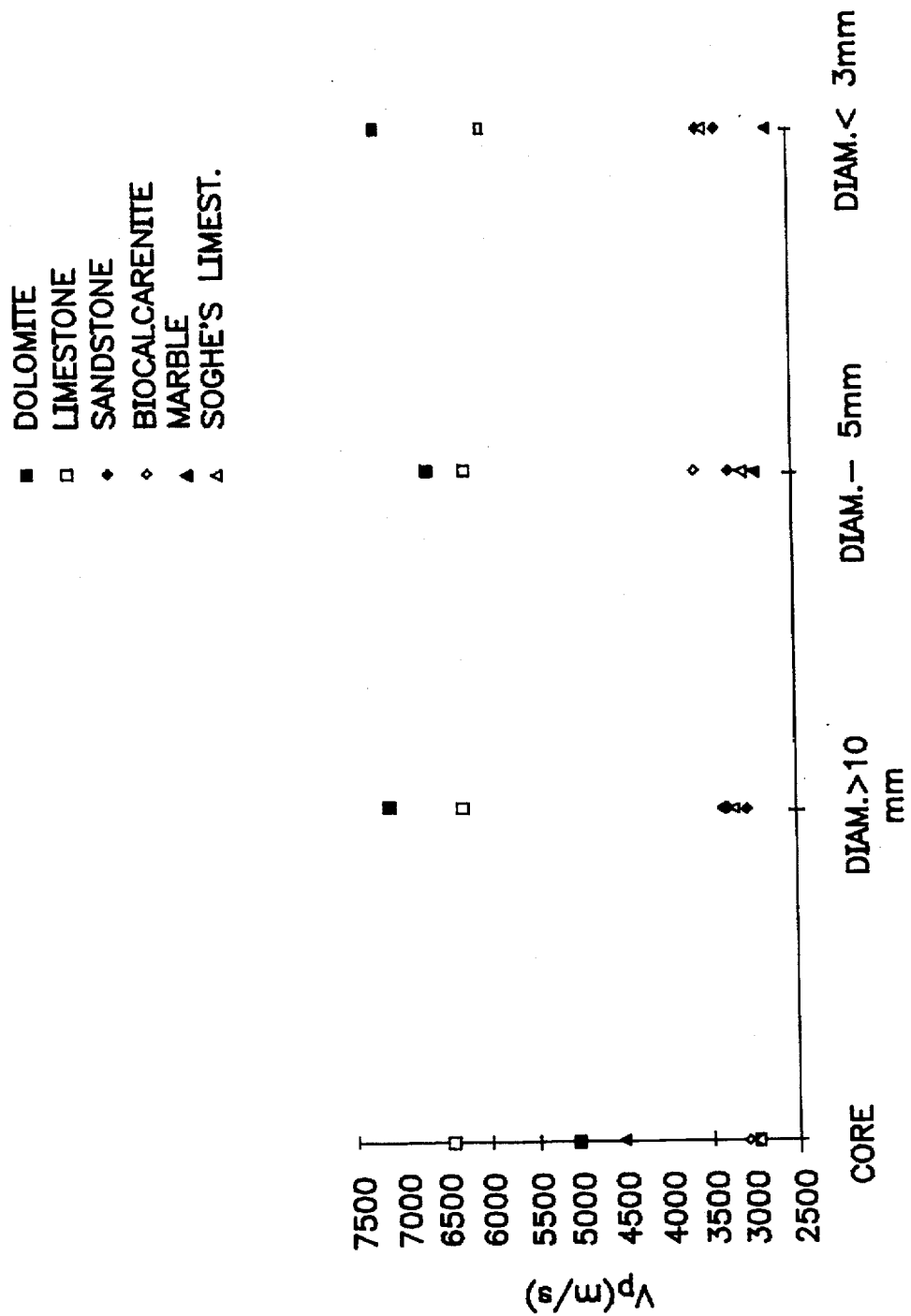
FIG. 1 is a graphical comparison of the compressional wave velocity measurements which were obtained in accordance with the method of the present invention for each of three different sizes of rock fragments of six different lithologies.

For solely exemplative purpose and without restricting the invention in any way, it should be noted that the experimental equipment used by the Applicant for the method of the present invention, consists of:

a pulse generator with a pulse width varying from 0.1 µs to 20 µs, and preferably from 0.1 µs to 2 µs;

a pair of piezoelectric transducers capable of generating highly damped compressional ultrasonic waves, with a band width of 100% or, alternatively, a pair of piezoelectric transducers capable of generating highly damped shear ultrasonic waves, with a band width of 100%;

a digital oscilloscope with a minimum resolution of $10^{-2}$ µs.

If the attenuation of the materials is so high as not to allow the detection of the signals by the oscilloscope alone, an amplifier with a varying gain can be used.

The transducers selected, characterized by a very high damping and an extreme selectivity in the polarization, also enable measurements on cuttings with extremely reduced dimensions without edge effects, multiple reflections and in particular, as far as the shear waves are concerned, effects due to mode conversion are practically absent as the high selectivity of the transducers ensures that the compressional component generated by the shear waves owing to discontinuities occurring during the propagation does not overlap the shear perturbation itself.

In conclusion, the advantages of the method of the present invention, may be summarized as follows:

measurement of propagation velocity of compressional and shear ultrasonic waves through cuttings and calculation of both the relative transit time and elastic moduli;

instrument which can be industrially used for on rig-site measurements;

simplicity and quickness in carrying out the tests with up to 10–12 determinations on cuttings per hour by a single operator, including the preparation times of the samples, the measurement of the propagation velocity and data processing;

good reproducibility of the measurement and absence of scale effect on homogeneous samples of different dimensions;

dimensions of the cuttings even less than the diameter of the transducers, which consequently does not limit the use of the method of the present invention;

the parallelism of the surfaces of the cuttings in contact with the transducers must be ensured only to guarantee a correct measurement of the length of the samples;

the method has proved to be applicable also for samples characterized by an average pore radius of more than 50 µm;

a completely new aspect is also the determination on cuttings of both propagation velocities of ultrasonic waves (compressional and shear) as it permits the mechanical characterization of the material, within the range of the linear elasticity theory, and therefore the calculation of the elastic moduli (Young, Bulk, Shear and Poisson) and in particular the application of semi-empirical models (such as for example Coates & Denoo or Deree & Miller) to determine the mechanical rock strength.

Owing to the extreme compactness, low cost and transportability of the experimental equipment necessary for carrying out the tests, as well as the possibility of using cuttings with extremely reduced dimensions, this method can be successfully used directly on rig-site, providing a source of "while drilling" information.

The experimental example below is again illustrative but does not limit the present invention in any way.

EXAMPLE 1

To verify the reliability of the method and the dependence of the measurement on the dimension of the test samples, cores of 6 different lithologies were selected on which the velocity of compressional and shear waves were measured using the "Pulse Velocity" method (to be considered as reference values).

3 cuttings of different dimensions were produced, by crashing, from each core.

Each cutting was smoothed with two flat parallel sides using a diamond grinding disc and the thickness was measured (tolerance 0.01 mm).

The equipment used consisted of: the emitter transducer connected to a pulse generator, a thin layer of coupling fluid (having a viscosity of 420 poises measured with a shear velocity gradient of $3.1\ s^{-1}$), the cutting previously prepared, a further layer of fluid and the receiving transducer, connected to the oscilloscope.

The electric pulse produced by the generator stimulates the emitting transducer which transmits an ultrasonic wave (compressional or shear, depending on the transducer used) through the cutting.

The receiving transducer converts the acoustic wave into an electric signal, which is then visualized on the oscilloscope.

It is therefore possible, considering the time delay of the transducers and circuit, to determine the transit time of the ultrasonic wave through the cutting.

As the thickness of the cutting is measured, the propagation velocity of the compressional or shear ultrasonic waves is determined.

The preliminary tests carried out in the laboratory on cuttings produced from cores, showed a good reproducibility of the measurement and the absence of scale effects for homogeneous samples.

Figure 2:
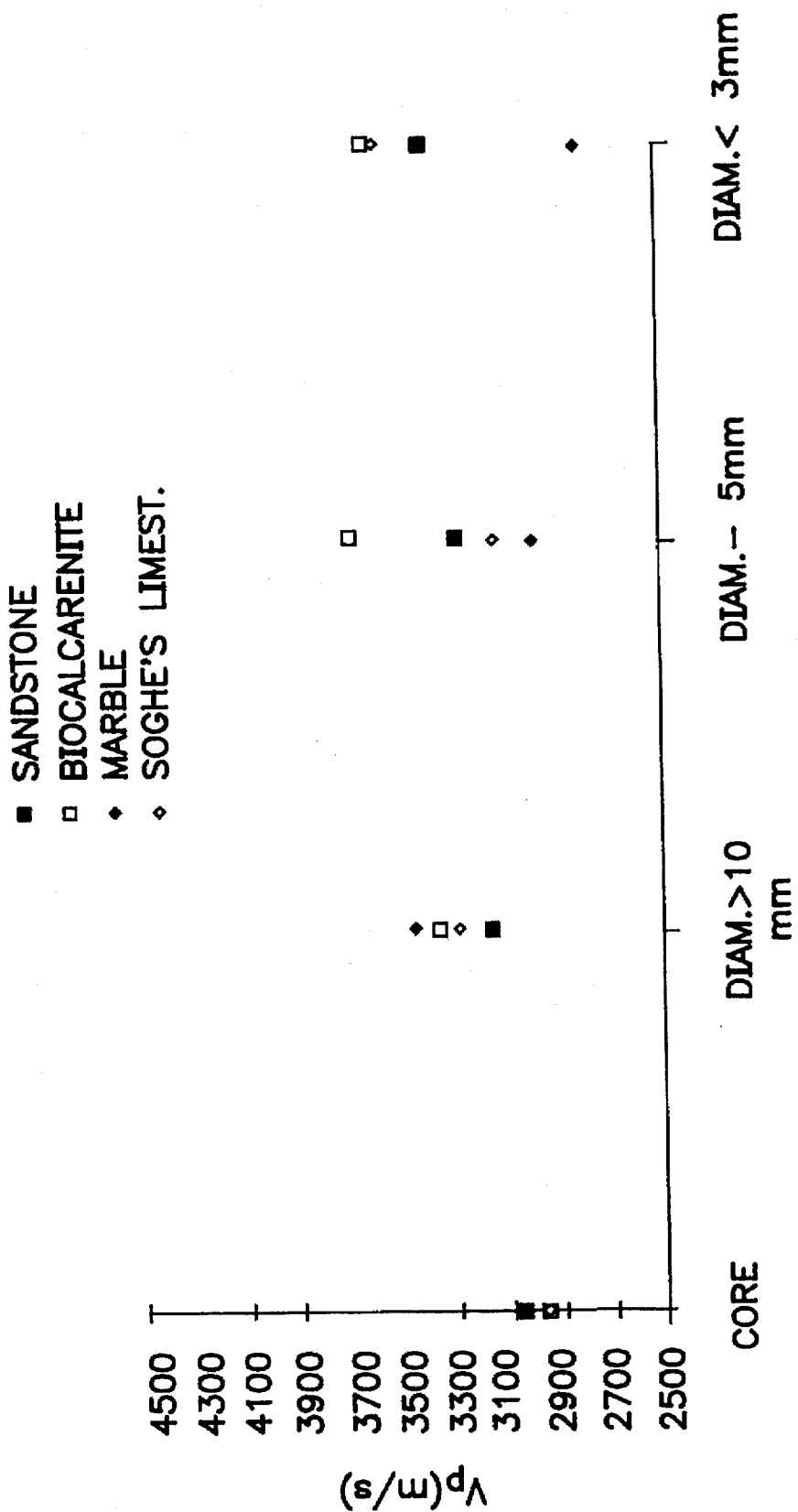
FIG. 2 is the same as the graphical comparison of FIG. 1, except that the compressional wave velocities of only four of the rock lithologies are shown in a larger wave velocity scale.
Figure 3:
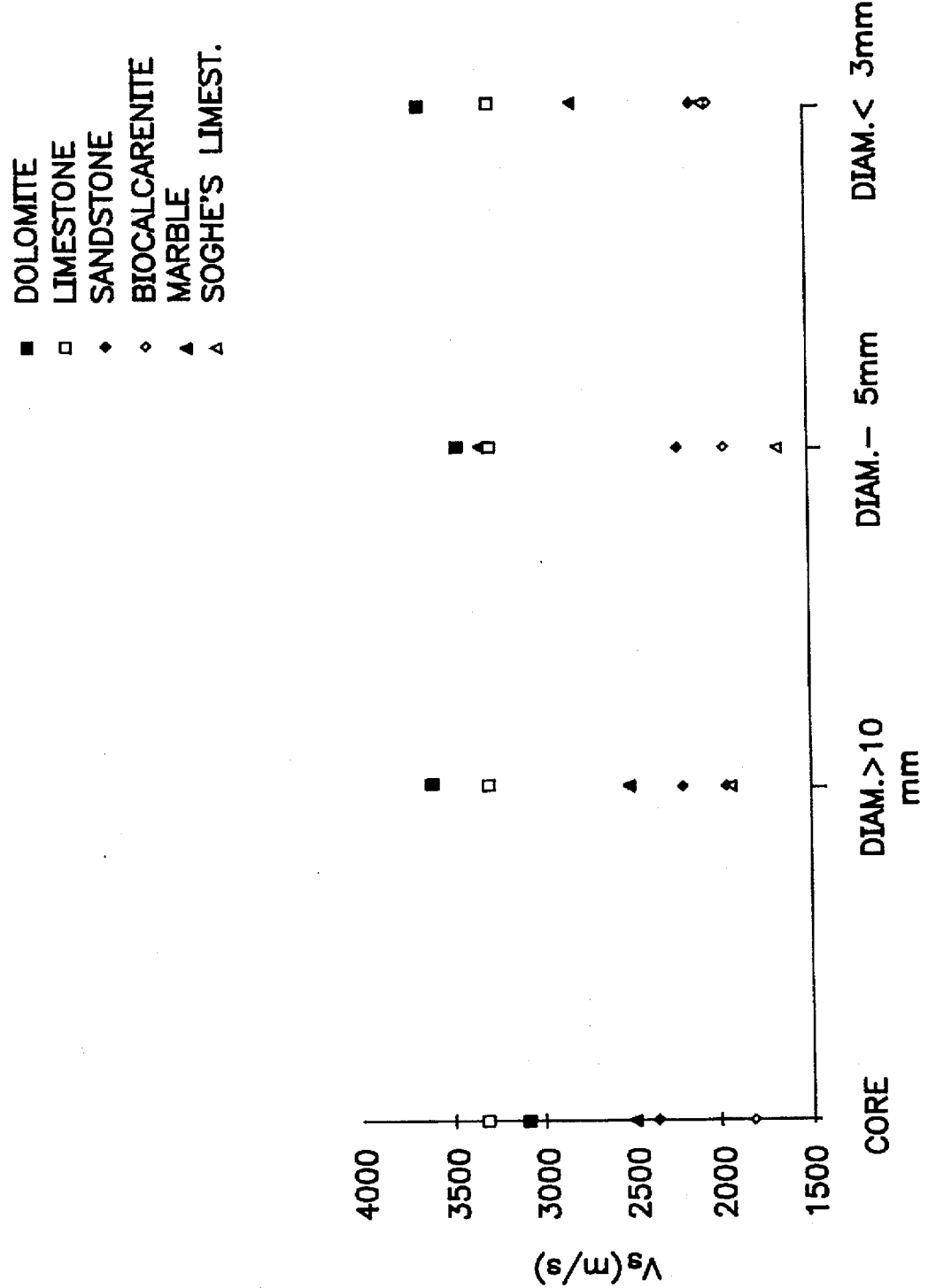
FIG. 3 is a graphical comparison of the shear wave velocity measurements which were obtained in accordance with the method of the present invention for three different sizes of rock fragments of six different rock lithologies.
Figure 4:
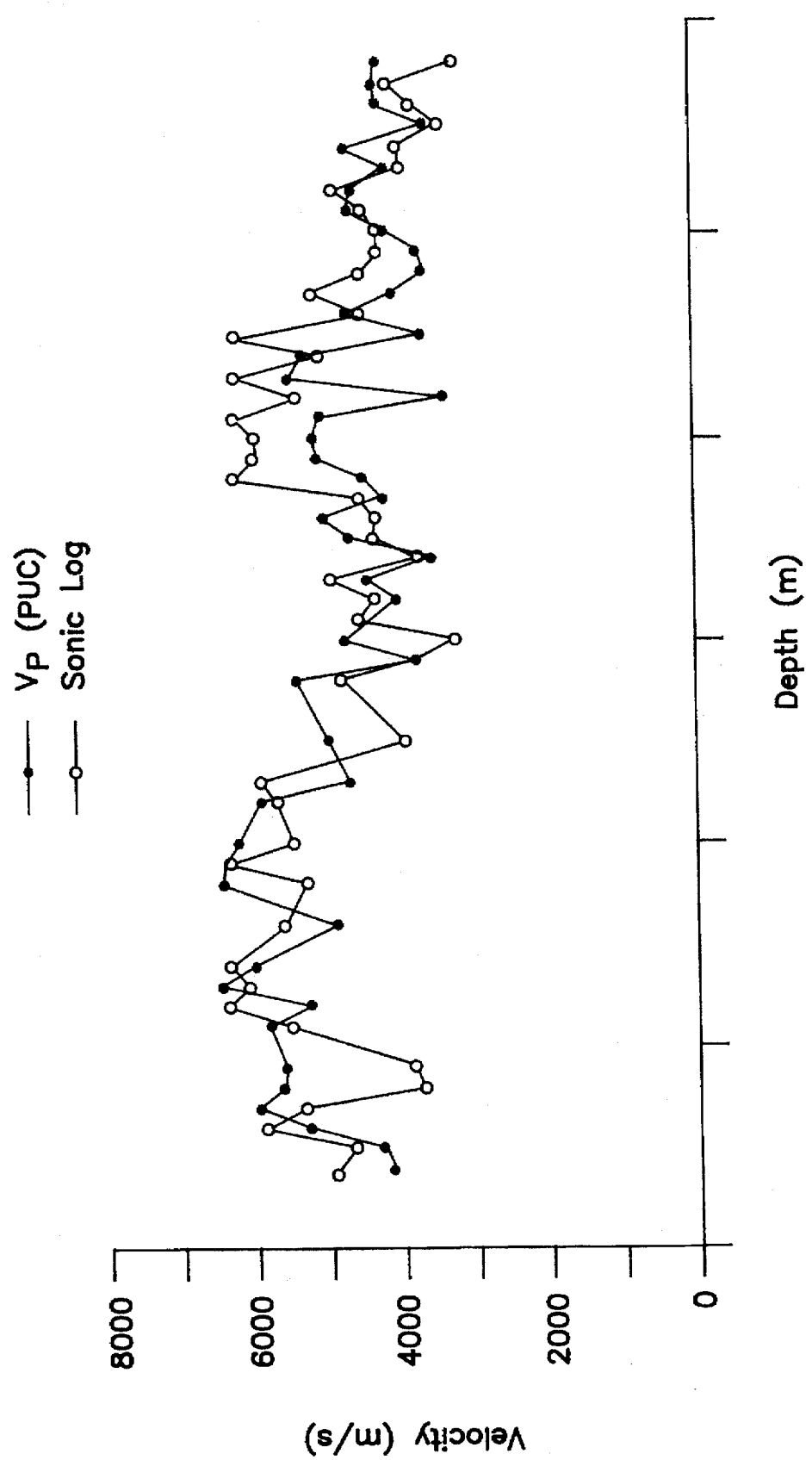
FIG. 4 is a graphical comparison of the compressional wave velocity measurements for rock fragments obtained at different drilling depths using both the pulse velocity technique and the sonic log technique.

In particular Table 1 shows the results relating to the velocity measurements on compressional waves (Vp) and shear waves (Vs) carried out on the 6 different selected lithologies, for each of which are indicated: the reference value measured on a core with the "Pulse Velocity" method (ref.) and 3 measurements carried out with the method of the present invention, on cuttings of different dimensions (G>10 mm, M~5 mm, P<3 mm) in order to show the scale effects and in FIGS. 1, 2 and 3 these values are graphically represented.

It should be noted that, in the case of Dolomite, the differences shown by the velocity values are due to the presence of fractures present only in the core and not in the cuttings.

TABLE 1

| Vp (m/s) | Vs (m/s) | Lithology |
| --- | --- | --- |
| 5046 | 3100 | Dolomite ref. |
| 7195 | 3661 | Dolomite G |
| 6678 | 3487 | Dolomite M |
| 7194 | 3676 | Dolomite P |
| 6435 | 3344 | Limestone ref. |
| 6382 | 3361 | Limestone G |

TABLE 1-continued

| Vp (m/s) | Vs (m/s) | Lithology |
|---|---|---|
| 6261 | 3335 | Limestone M |
| 5990 | 3307 | Limestone P |
| 3057 | 2366 | Sandstone ref. |
| 3184 | 2258 | Sandstone G |
| 3298 | 2267 | Sandstone M |
| 3407 | 2162 | Sandstone P |
| 2973 | 1813 | Biocalcarenite ref. |
| 3384 | 1996 | Biocalcarenite G |
| 3696 | 1998 | Biocalcarenite M |
| 3618 | 2045 | Biocalcarenite P |
| 4568 | 2495 | White marble ref. |
| 3476 | 2544 | White marble G |
| 3018 | 3370 | White marble M |
| 2832 | 2817 | White marble P |
| 2976 | 1842 | Soghe's limestone ref. |
| 3312 | 1982 | Soghe's limestone G |
| 3162 | 1711 | Soghe's limestone M |
| 3583 | 2095 | Soghe's limestone P |

We claim:

1. Method for measuring the propagation velocities of ultrasonic acoustic waves through rock fragments, said method comprising:

(a) introducing each fragment into a pair of piezoelectric transducers with a coupling fluid between the fragment itself and such transducers, said transducers being capable of generating highly damped ultrasonic acoustic waves;

(b) passing highly damped ultrasonic acoustic waves through the fragment of interest, said waves being generated by a pulse generator with a pulse width varying from 0.1 µs to 20 µs;

(c) visualizing the obtained electric signals by an oscilloscope with a resolution of at least $10^{-2}$ µs;

(d) measuring the transit time of the waves themselves.

2. Method according to claim 1, characterized in that the pulse width is preferably from 0.1 µs to 2 µs.

3. Method according to claim 1, characterized in that the ultrasonic acoustic waves can be compressional or shear waves.

4. Method according to claim 1, characterized in that the coupling fluid has a viscosity varying between 200 and 800 poises.

5. Method according to claim 1, characterized in that the equipment comprises an amplifier with a varying gain.

6. The method of claim 1, wherein said fragment has a diameter of about one centimeter or less.

7. The method of claim 1, wherein said fragment has an average pore radius of at least about 50 µm.

\* \* \* \* \*